(12) United States Patent
Bismarck et al.

(10) Patent No.: US 8,261,824 B2
(45) Date of Patent: Sep. 11, 2012

(54) METHODS FOR FORMING A PERMEABLE AND STABLE MASS IN A SUBTERRANEAN FORMATION

(75) Inventors: Alexander Bismarck, Peterborough (GB); Angelika Menner, London (GB); Vivian Ikem, Croydon (GB)

(73) Assignee: Halliburton Energy Services, Inc., Duncan, OK (US)

( * ) Notice: Subject to any disclaimer, the term of this patent is extended or adjusted under 35 U.S.C. 154(b) by 215 days.

(21) Appl. No.: 12/536,599

(22) Filed: Aug. 6, 2009

(65) Prior Publication Data

US 2011/0030948 A1 Feb. 10, 2011

(51) Int. Cl.
*E21B 43/02* (2006.01)
(52) U.S. Cl. ........................ 166/276; 166/300; 166/305.1
(58) Field of Classification Search .......................... None
See application file for complete search history.

(56) References Cited

U.S. PATENT DOCUMENTS

| | | | | |
|---|---|---|---|---|
| 4,522,953 A * | 6/1985 | Barby et al. | ..................... | 521/64 |
| 6,011,075 A * | 1/2000 | Parris et al. | ..................... | 521/64 |
| 7,267,169 B2 | 9/2007 | Powell et al. | | |
| 2006/0185846 A1* | 8/2006 | Powell et al. | .................. | 166/276 |
| 2007/0225174 A1 | 9/2007 | Berry et al. | | |
| 2011/0034583 A1 | 2/2011 | Bismarck et al. | | |

FOREIGN PATENT DOCUMENTS

| | | |
|---|---|---|
| WO | 2009-013500 A1 | 1/2009 |
| WO | 2009-013500 A8 | 1/2009 |
| WO | 2010-058148 A1 | 5/2010 |
| WO | 2010-081821 A1 | 7/2010 |

OTHER PUBLICATIONS

Science Lab.com Material Safety Data Sheet, Divinylbenzene, Practical MSDS, retrieved Jun. 15, 2011 from http://www.sciencelab.com/msds.php?msdsId=9923873.*
Science Lab.com Material Safety Data Sheet, Styrene (monomer) MSDS, retrieved Jun. 15, 2011 from http://www.sciencelab.com/msds.php?msdsId=9925112.*
Science Lab.com Material Safety Data Sheet, Sorbitan Monooleate MSDS, retrieved Jun. 15, 2011 from http://www.sciencelab.com/msds.php?msdsId=9927282.*
British Standard Compression Test: Cellular plastics—Compression test for rigid materials—Specification, BS ISO 844:1998, 1998, 15 pages.
Menner, A., et al., "A new route to carbon black filled polyHIPEs," Soft Matter, 2006, 2, 337-342.
Colver, P.J., et al., "Cellular Polymer Monoliths Made via Pickering High Internal Phase Emulsions," Chemistry of Materials, 2007, 19, 1537-1539.
Menner, A., et al., "High internal phase emulsion templates solely stabilised by functionalised titania nanoparticles," Chemical Communicaitons, 2007, 4274-4276.
Menner, A., et al., "Particle-Stabilized Surfactant-Free Medium Internal Phase Emulsions as Templates for Porous Nanocomposite Materials: poly-Pickering-Foams," Langmuir, 2007, 23, 2398-2403.
Small, P. W., et al., "Design and Application of a New Rigid Support for High Efficiency Continuous-flow Peptide Synthesis," Journal of the Chemical Society—Chemical Communications, 1989, 21, 1589-1591.
Wakeman, R.J., et al., "Ion exchange modules formed from polyhipe foam precursors," Chemical Engineering Journal, 1998, 70, 133-141.
Barbetta, A., et al., "Porous Polymers by Emulsion Templating," Macromolecular Symposia, 2005, 226, 203-211.
Cameron, N.R., et al., "High Internal Phase Emulsions (HIPEs)—Structure, Properties and Use in Polymer Preparation," Biopolymers Liquid Crystalline Polymers Phase Emulsion, 1996, vol. 126, 163-214.
Biasetto, L., et al., "Gas Permeability of Microcellular Ceramic Foams," Industrial & Engineering Chemistry Research, 2007, 46, 3366-3372.
Ikem, V.O., et al., "High Internal Phase Emulsions Stabilized Solely by Functionalized Silica Particles," Angewandte Chemie—International Edition, 2008, 47, 8277-8279.
Patent Application GB 0903110.5 filed Feb. 24, 2009 and filing receipt, 27 pages.
Cameron, High Internal Phase Emulsion Templating as a Route to Well-Defined Porous Polymers, Science Direct, Polymer 46, 1439-1449, 2005.
Office Action for U.S. Appl. No. 12/536,605 dated Jul. 13, 2011.

\* cited by examiner

*Primary Examiner* — Angela M DiTrani
(74) *Attorney, Agent, or Firm* — Robert A. Kent; McDermott Will & Emery LLP

(57) ABSTRACT

Certain emulsions and masses produced using those emulsions exhibited improved permeability and stability. In one embodiment, the methods comprise: providing a composition that comprises a plurality of inorganic particulates, an aqueous component, and an organic component comprising at least one polymerizable monomer and at least one surface active agent in an amount of up to about 10% by volume of the organic component; permitting the composition to form an emulsion that comprises an internal aqueous phase in an amount of at least about 50% by volume of the emulsion and a continuous organic phase; introducing the composition into at least a portion of a subterranean formation; and permitting the composition to form a porous polymer mass in at least a portion of the subterranean formation.

20 Claims, 3 Drawing Sheets

METHODS FOR FORMING A PERMEABLE AND STABLE MASS IN A SUBTERRANEAN FORMATION

CROSS-REFERENCE TO RELATED APPLICATIONS

The present application is related to co-pending U.S. application Ser. No. 12/536,605, published as U.S. Publication No. 2011/0034583, filed concurrently herewith, the entire disclosure of which is incorporated herein by reference.

BACKGROUND

The present invention relates to methods and compositions that may be useful in subterranean operations, and more specifically, to certain emulsions and masses produced using those emulsions exhibiting improved permeability and stability, and methods of preparation and use in subterranean operations.

Hydrocarbon production from subterranean formations commonly involves, inter alia, drilling a well bore that penetrates the hydrocarbon-bearing formation, and producing hydrocarbon fluids (e.g., oil and/or gas) through the well bore to the surface. In some cases, treatment fluids also may be introduced into the well bore to perform a variety of functions, such as stimulating the production of hydrocarbon fluids from the formation, removing undesirable substances from the formation, facilitating the drilling of a well bore, and numerous other functions. Loss of treatment fluids into permeable portions of the subterranean formation may be undesirable since it may, inter alia, result in the reduction of fluid pressure below a level necessary for certain treatments, or may preclude the complete treatment of certain areas of the formation. When the formation is one that may be characterized as poorly or weakly consolidated, efficient treatment and hydrocarbon production may be complicated by, inter alia, well bore instability and the migration of sand and/or "fines" from the formation. Migration of fines (e.g., particles from the formation) along with produced fluids and treatment fluids may be undesirable since they may, inter alia, damage both downhole equipment and surface equipment, and typically must be disposed of in an environmentally-acceptable manner.

Conventional attempts to address the problems of well bore instability and formation fines migration have involved operations referred to as "gravel packing." Typical gravel packing treatments involve suspending particulates (commonly referred to as "gravel particulates") in a fluid, placing that fluid in the well bore, and depositing at least a portion of those particulates in a desired area in or near the well bore, e.g., near unconsolidated or weakly consolidated formation zones, to form a gravel pack. In general, a gravel pack is a grouping of particulates that are packed sufficiently close together so as to prevent the passage of certain materials through the gravel pack while having sufficient permeability to permit fluids (e.g., treatment fluids, produced fluids, etc.) to flow through. This gravel pack may, inter alia, enhance sand control in the subterranean formation and/or prevent the flow of particulates from an unconsolidated portion of the subterranean formation into a well bore. One common type of gravel-packing operation involves placing a screen in the well bore and packing the annulus between the screen and the well bore with the gravel particulates of a specific size designed to prevent the passage of formation fines. The gravel particulates act, inter alia, to prevent the sand and formation fines from occluding the screen or migrating with treatment fluids and produced fluids, and the screen acts, inter alia, to prevent the particulates from entering the well bore. The gravel particulates may also be coated with certain types of materials, including resins, tackifying agents, and the like, among other purposes, to enhance conductivity (e.g., fluid flow) through the gravel pack in which they reside. In some instances, expandable screens that can be expanded or inflated once placed inside a well bore to more closely fit against the walls of the well bore may be used in these treatments.

Conventional gravel packing operations, as well as operations involving the use of expandable screens, have been problematic. Bridging of sand particles within the gravel pack may occur, which may create voids within the gravel pack. Void spaces also may occur with expandable screens, wherein a well bore is drilled in a soft formation and formation material may be washed out in certain locations, which may enlarge the diameter of the bore hole in the washed-out regions. Installing screens and gravel packs in a well bore may be costly and time consuming, and may be impractical to use in certain applications, for example, in well bores that are too narrow to accommodate equipment necessary for the gravel packing treatment and other downhole operations.

SUMMARY

The present invention relates to methods and compositions that may be useful in subterranean operations, and more specifically, to certain emulsions and masses produced using those emulsions exhibiting improved permeability and stability, and methods of preparation and use in subterranean operations.

In one embodiment, the present invention provides a method comprising: providing a composition that comprises a plurality of inorganic particulates, an aqueous component, and an organic component comprising at least one polymerizable monomer and at least one surface active agent in an amount of up to about 10% by volume of the organic component; permitting the composition to form an emulsion that comprises an internal aqueous phase in an amount of at least about 50% by volume of the emulsion and a continuous organic phase; introducing the composition into at least a portion of a subterranean formation; and permitting the composition to form a porous polymer mass in at least a portion of the subterranean formation.

In another embodiment, the present invention provides a method comprising: providing an emulsion that comprises a plurality of inorganic particulates, an internal aqueous phase in an amount of at least about 50% by volume of the emulsion, and a continuous organic phase comprising at least one polymerizable monomer and at least one surface active agent in an amount of up to about 10% by volume of the organic phase; introducing the emulsion into at least a portion of a subterranean formation; and permitting the emulsion to form a porous polymer mass in at least a portion of the subterranean formation.

In another embodiment, the present invention provides a method comprising: providing an emulsion that comprises a plurality of inorganic particulates, an internal aqueous phase in an amount of at least about 50% by volume of the emulsion, and a continuous organic phase comprising at least one polymerizable monomer; adding at least one surface active agent to the emulsion in an amount of up to about 10% by volume of the organic phase; introducing the emulsion into at least a portion of a subterranean formation; and permitting the emulsion to form a porous polymer mass in at least a portion of the subterranean formation.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

Figure 1:
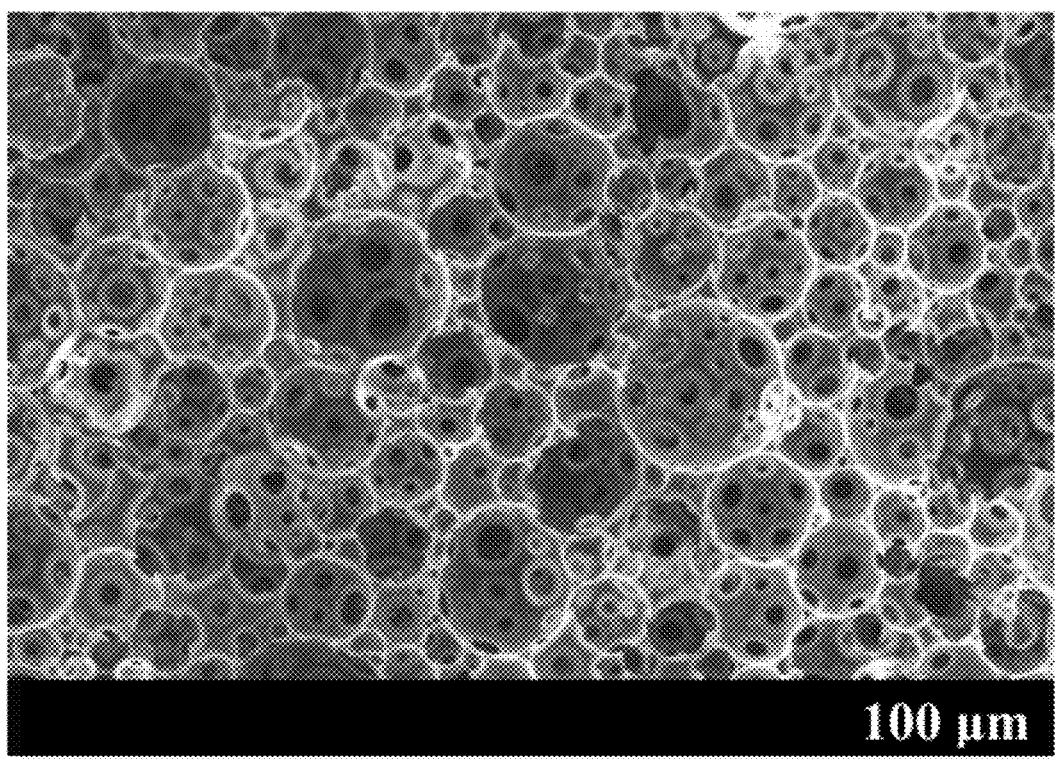
FIG. 1 is a Scanning Electron Microscope ("SEM") Image of the polymer foam prepared in Example 1.

The present invention relates to methods and compositions that may be useful in subterranean operations, and more specifically, to certain emulsions and masses produced using those emulsions exhibiting improved permeability and stability, and methods of preparation and use in subterranean operations.

The compositions of the present invention generally comprise a plurality of inorganic particulates, an aqueous component, and an organic component, the organic component comprising at least one polymerizable monomer and at least one surface active agent. These components may form a water-in-oil emulsion that comprises a plurality of inorganic particulates, an internal aqueous phase, and a continuous organic phase, the organic phase comprising at least one polymerizable monomer and at least one surface active agent. In certain embodiments, the plurality of inorganic particulates may be dispersed in the organic component, but ultimately may irreversibly adsorb at the water/oil interface in an emulsion of the present invention. The emulsions of the present invention generally have large internal phase volume fractions (at least about 50%), and in certain embodiments, may comprise high internal phase emulsions ("HIPE"). The compositions of the present invention may be placed in desired locations within a subterranean formation (e.g., in portions of a well bore that penetrates the subterranean formation), whereupon they may be permitted to polymerize to form a substantially solid, open-celled, porous polymer mass that comprises pore spaces interconnected by pore throats through which fluids may flow. Once polymerized, the compositions of the present invention form a generally fluid-permeable barrier, for example, between the formation and the portion of a well bore wherein the composition is disposed (e.g., a screen). In certain embodiments, these permeable, solid masses of the present invention may comprise pore spaces at least about 40 µm in diameter, pore throats at least about 10 µm in diameter connecting those pore spaces, and may exhibit permeabilities of about 500 millidarcies or greater. In certain embodiments, these permeable masses may comprise pore spaces of up to about 1500 µm in diameter, pore throats of up to about 200 µm in diameter connecting the pore spaces, and may exhibit permeabilities of about 3.2 Darcies or greater.

The aqueous component of the compositions of the present invention may comprise water from any source, provided that it does not contain an excess of compounds that may adversely affect the stability of an emulsion (e.g., compounds such as water-soluble alcohols, acetone, tetrahydrofuran, and the like) or its intended use. For example, the water may comprise fresh water, salt water (e.g., water containing one or more salts dissolved therein), brine (e.g., saturated salt water), seawater, and/or any combination thereof. The aqueous component may comprise other elements (e.g., electrolytes, initiators) that may be included, for example, to improve the performance and/or stability of the emulsion, or for any other purpose suitable for the intended application. In certain embodiments, the aqueous component (e.g., the aqueous phase) may be present in the compositions of the present invention in an amount of at least about 50% by volume of the composition (e.g., the emulsion). In certain embodiments, the aqueous component (e.g., the aqueous phase) may be present in the compositions of the present invention in an amount of at least about 70% by volume of the composition (e.g., the emulsion). In certain embodiments, the aqueous component (e.g., the aqueous phase) may be present in the compositions of the present invention in an amount of at least about 80% by volume of the composition (e.g., the emulsion).

The organic component of the compositions of the present invention comprises one or more polymerizable monomers. The polymerizable monomer may comprise any monomer or combination of monomers whose molecules can interact to form a polymer, for example, through the interaction of free radicals. Suitable monomers may comprise, for example, vinyl-based monomers. In certain embodiments, at least one of the polymerizable monomers comprises a crosslinker. Examples of crosslinkers that may be suitable for use in the present invention include, but are not limited to, divinylbenzene (DVB), poly(ethylene glycol) dimethacrylate (PEGDMA), tri(propylene glycol) diacrylate, 1,4-butanediol diacrylate, ethylene glycol dimethacrylate, any derivatives thereof, and any combinations thereof. Examples of other polymerizable monomers that may be suitable for use in the present invention include, but are not limited to, methacryloxypropyltrimethoxysilane, styrene, methylmethacrylate, 2-ethylhexyl methacrylate, 2-ethylhexyl acrylate, any derivatives thereof, and any combinations thereof. Different monomers and combinations thereof may be selected, among other reasons, based on the mechanical and/or chemical properties of the polymer that they form upon polymerization. For example, certain monomers may be selected to reduce the brittleness and increase the shear resistance of the solid material formed by polymerization. In certain embodiments, a crosslinker (or combination thereof) and another polymerizable monomer (or combination thereof) each may be present in the composition in an amount of from about 20% to about 50% by volume of the organic component. A person of ordinary skill in the art, with the benefit of this disclosure, will recognize the types and amounts of monomers that will produce polymers with the desired properties for a particular application of the present invention.

In certain embodiments, an initiator may be used to generate free radicals of the polymerizable monomer(s), which may comprise any such initiator or method of free radical initiation known in the art. Suitable initiators generally include those that are soluble in the organic component. However, in certain embodiments, an initiator may be present in the aqueous component. Example of initiators that may be suitable for use in the present invention include, but are not limited to, α,α-azoisobutyronitrile (AIBN), 2,2'-azodi(2-methylbutyronitrile), 2,2-di(4,4-di(tertbutylperoxy)cyclohexyl) propane, di-cumylperoxide, derivatives thereof, and combinations thereof. Certain initiators may be present in the composition in an amount in the range of from about 1 mol % to about 2 mol % with respect to the polymerizable monomer(s). The choice of initiator to be included may depend on factors such as, inter alia, the temperature that may be encountered within the formation where the composition may be used. For example, AIBN may be particularly useful for applications wherein the formation temperature may be in the range of from about 60° C. to about 90° C., while 2,2'-azodi(2-methylbutyronitrile) may be particularly useful for applications wherein the formation temperature may be in the range of from about 70° C. to about 110° C. As another example, 2,2-di(4,4-di(tertbutylperoxy)cyclohexyl)propane may be particularly useful for applications wherein the formation temperature may be in the range of from about 90° C. to about 120° C., while di-cumylperoxide may be particularly useful for applications wherein the formation temperature may be in the range of from about 110° C. to about 165° C.

The compositions of the present invention also comprise a plurality of inorganic particulates that may, among other things, stabilize an emulsion of the present invention. Suitable particles may include any particles of inorganic material having the appropriate surface wettability characteristics (i.e., hydrophobicity) to adsorb at the oil/water interface, which may facilitate the creation of emulsions and the enlargement of droplet size. Among other things, this may lead to enlarged pore spaces in composition of the present invention once the monomer in the organic component polymerizes. Examples of materials that the inorganic particles may comprise include, but are not limited to, inorganic oxides such as silica, titania, derivatives thereof, and/or combinations thereof. In certain embodiments, the particles may be treated (either prior to or during the course of an application of the present invention) in order to adjust their surface wettability to meet the requirements of a desired application. This may be accomplished, for example, by adsorbing surfactant or fatty acid molecules onto the particle surfaces, at least partially coating the particle surface with another material, silanation, and/or other techniques known in the art. In certain embodiments, the inorganic particles may comprise particles that have an average diameter of about 10 μm or less in diameter. In certain embodiments, the particles may comprise nanoparticles (i.e., particle sizes of less than about 1 μm in diameter). In certain embodiments, the inorganic particles may comprise particles that have an average diameter of less than about 500 nanometers in diameter. In certain embodiments, the inorganic particles may comprise particles having an average diameter of about 20-100 nanometers. In certain embodiments, the inorganic particles may comprise particles having an average diameter of about 15-50 nanometers.

The particles may be present in a composition of the present invention in any amount that creates sufficient interface between the organic and aqueous components to form a stable emulsion, up to the maximum amount of particulates that can be practically incorporated into the composition. In certain embodiments, the particulates may be present in an amount up to about 40% by weight of the composition. In certain embodiments, the particulates may be present in an amount up to about 10% by weight of the composition. In certain embodiments, the particulates may be present in an amount of from about 0.5% to about 8% by weight of the composition. In certain embodiments, the particulates may be present in an amount of about 7% by weight of the composition. A person skilled in the art, with the benefit of this disclosure, will recognize the types and amounts of particles that may be included in the compositions of the present invention in a particular application based on, among other things, the composition of the aqueous and organic components, the desired size of the pore spaces in the composition of the present invention once the monomer in the organic component polymerizes, the desired properties of the porous polymer mass following polymerization, and/or other factors.

Additional descriptions of the aqueous phase, organic phase, polymerizable monomer, initiator, and other optional elements of the compositions, emulsions, and methods of the present invention that may be useful in conjunction with the present invention are disclosed in, for example, U.S. Pat. No. 7,267,169 and U.S. application Ser. No. 12/670,249, published as U.S. Publication No. 2010/0261803, the entire disclosures of which are hereby incorporated by reference.

The organic component of the compositions of the present invention comprises one or more surface active agents, or in certain methods of the present invention, one or more surface active agents may be added to the organic phase of a pre-existing emulsion. The surface active agent(s) may comprise any compound that facilitates the formation of pore throats between pore spaces formed in the compositions of the present invention as the monomer in the organic component polymerizes. In certain embodiments, the surface active agent may be removed once the monomer in the organic component has polymerized, leaving open pore throats between the pore spaces in the composition. For example, the surface active agent may comprise one or more surfactants. Suitable surfactants for use in the present invention preferably are not water soluble, and preferably are poorly soluble in the polymerizable monomer(s). In certain embodiments, suitable surfactants may be non-ionic, and may have an HLB value in the range of between about 4.2 and about 8.6. In certain embodiments of the present invention, a mixture of surfactants may be used. In certain embodiments, a polymeric surfactant may be used, either as a sole surfactant or in combination with other surfactants (e.g., non-polymeric surfactants). Examples of suitable surfactants include, but are not limited to, those that are commercially available from Uniqema under the trade names HYPERMER 2296, HYPERMER B246SF, and ARLACEL P135. Other examples of suitable surfactants include, but are not limited to, those that are commercially available from Merck and other suppliers under the trade name SPAN 20. Generally, the surface active agent(s) may be present in or added to the organic component in an amount of up to about 10% by volume of the organic component. In certain embodiments, the surface active agent(s) may be present in or added to the organic component in an amount of about 5% by volume of the organic component.

The compositions and emulsions of the present invention optionally may comprise any number of additional additives, provided that they do not adversely affect the stability of an emulsion (e.g., compounds such as water-soluble alcohols, acetone, tetrahydrofuran, and the like) or its intended use. Examples of such additives that may be suitable include, but are not limited to, salts, additional surfactants (e.g., co-surfactants), acids, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, dispersants, flocculants, $H_2S$ scavengers, $CO_2$ scavengers, oxygen scavengers, lubricants, viscosifiers, breakers, weighting agents, relative permeability modifiers, resins, wetting agents, coating enhancement agents, hydrogels, and the like. A person skilled in the art, with the benefit of this disclosure, will recognize the types of additives that may be included in the compositions of the present invention for a particular application.

Certain methods of the present invention generally comprise: providing a composition (e.g., an emulsion) that comprises a plurality of inorganic particulates, an aqueous component (e.g., an internal aqueous phase), and an organic component (e.g., a continuous organic phase), the organic component comprising at least one polymerizable monomer and at least one surface active agent; introducing the composition into at least a portion of a subterranean formation; and permitting the composition to form a porous polymer mass in at least a portion of the subterranean formation. In certain embodiments of the present invention, the compositions useful with the present invention may be prepared, and/or placed within a subterranean formation using any suitable means known in the art. For example, the elements of the organic component, the elements of the aqueous component, and any optional elements may be mixed to form a water-in-oil emulsion. In certain embodiments, an emulsion may be formed before or while the composition is placed in at least a portion of the subterranean formation. The compositions may be flowed into a desired portion of a subterranean formation (e.g., a desired location in a well bore in the formation). For example, the desired location may be in the annular space between a fluid conduit (e.g., a perforated casing, slotted liner, perforated liner, and the like) and the formation. In certain embodiments, the desired location within the formation may be, for example, an annulus in the formation that is defined by the outer surface of the fluid conduit and a screen (e.g., an expandable screen). In some embodiments, the desired location within the formation may be an annulus that is defined by the outer surface of the fluid conduit and the walls of the well bore. In certain embodiments of the present invention, the composition may be placed in a screen that already resides in a subterranean formation, or the composition may be placed in a screen prior to placement of that screen in a subterranean formation. In other embodiments, the desired position within the formation may be an open space in the formation where it is desirable to reduce the rate of fluid flow into an adjacent portion of the formation. In certain embodiments of the present invention, the compositions may be circulated to the desired location within the formation through the use of a high-pressure pump.

After placement in the formation, the polymerizable monomer(s) in the organic component of the emulsion then may be permitted to polymerize therein for a desired time. In certain embodiments, the polymerization may produce a substantially rigid material that is both porous and permeable. The desired time over which the compositions may be permitted to polymerize within the formation may depend on a variety of factors, including, inter alia, the temperature of the subterranean formation, the rate at which heat is transferred from the formation to the composition, and the like. One of ordinary skill in the art, with the benefit of this disclosure, will be able to identify a suitable polymerization time for a particular application. In certain embodiments of the present invention, the compositions may be polymerized within the formation for at least about 12 hours. After the compositions have been permitted to polymerize within the subterranean formation for a desired time, a permeable, polymerized mass is formed such that treatment fluids and/or hydrocarbon fluids within the formation (e.g., oil and/or gas) can flow through it and into or out of the formation.

The compositions and methods of the present invention may be used in a variety of applications. For example, the compositions and methods of the present invention may be used, among other purposes, to prevent the movement of unconsolidated particles (e.g., formation fines, sands, proppant particulates, etc.) into a well bore, either instead of or in combination with conventional gravel packing treatments. In these embodiments, the compositions and/or emulsions of the present invention may be placed in a portion of a well bore adjacent to an unconsolidated portion of the subterranean formation, and may be used to form a porous polymer mass that creates a fluid-permeable barrier between the unconsolidated portion of the subterranean formation and the well bore. That fluid-permeable barrier may be used, inter alia, to prevent the migration of unconsolidated sand, particulates, and fines into the well bore. In certain embodiments, the compositions of the present invention may be placed within perforation tunnels, among other purposes, to prevent sand production. The compositions also may be used in injection wells as a renewable filtration media. In certain embodiments, the compositions may be incorporated into a pre-packed screen that may be prepared aboveground, and that subsequently may be placed in a desired location within a subterranean formation.

The compositions and methods of the present invention also may be used to place a diverting agent and/or as a fluid loss control additive to reduce or prevent the flow of certain fluids into certain portions of a subterranean formation. For example, the porous polymer mass, while fluid-permeable, may be less permeable than a portion of a subterranean formation and/or a well bore, and thus the compositions of the present invention may be placed in or adjacent to such permeable portions of a subterranean formation and/or a well bore to reduce the rate at which fluid leaks off into the formation, or to divert the flow of fluid to other more permeable areas. Alternatively, an emulsion of the present invention may be used as a temporary plug, diverting agent, or fluid loss control additive prior to polymerization, and then permit the diverted or retained fluids to flow through once the porous polymer mass is formed. A variety of other uses are possible, as will be recognized by one of ordinary skill in the art, with the benefit of this disclosure.

Additional descriptions of appropriate methods of preparing, placing, and using the compositions, emulsions, and methods of the present invention are disclosed in, for example, U.S. Pat. No. 7,267,169, the entire disclosure of which is incorporated by reference.

To facilitate a better understanding of the present invention, the following examples of certain aspects of some embodiments are given. In no way should the following examples be read to limit, or define, the entire scope of the invention.

EXAMPLES

Example 1

Sample Emulsion No. 1 was prepared comprising an 80 vol % internal aqueous phase and an organic phase comprising a 50:50 (by volume) mixture of styrene and divinylbenzene and 1 mol % AIBN. The emulsion also comprised 3 wt % with respect to the organic phase of silica particles pre-treated by adsorbing oleic acid onto the particle surfaces. An emulsion was formed in a reaction vessel under gentle stirring with an overhead stirrer at 400 rpm. After the emulsion was formed, 5 vol % with respect to the organic phase of HYPERMER 2296 surfactant was added dropwise to the emulsion under gentle stirring. On addition of the surfactant, the emulsion remained stable but its viscosity increased. The emulsion was then transferred to a Falcon tube and the styrene and divinylbenzene in the organic phase were permitted to polymerize in an oven at 70° C. for 24 hours, after which the sample was purified by soxhlet extraction with water, followed by acetone for 24 hours and then dried under vacuum at 120° C. for 24 hours, forming a rigid polymer foam.

The pore structure of the resulting polymer foam is shown in FIG. 1. This foam had pores of 40-200 μm in diameter and pore throats of 10-50 μm in diameter. The gas permeability of this polymer foam was measured using a gas pressure rise method (see details of method discussed below), and was determined to be 1.3 Darcy (D). The compressive strength of the foam was measured using the method described in BS ISO Standard 844 (published by the British Standards Institution in London, United Kingdom; available at www.bsonline.techindex.co.uk). The compressive strength for this polymer foam was 2±0.3 megapascals (MPa) (approximately 300 psi), but the polymer foam failed in a brittle manner above this applied load.

Thus, Example 1 demonstrates that certain embodiments of the compositions and emulsions of the present invention may produce porous foams of higher permeability than those known previously in the art.

Example 2

Sample Emulsions Nos. 2 and 3 each comprising an 80 vol % internal aqueous phase and an organic phase comprising a 50:50 (by volume) mixture of styrene and PEGDMA and 1 mol % AIBN. Sample Emulsion No. 2 also comprised 5 wt % with respect to the organic phase of silica particles pre-treated by adsorbing oleic acid onto the particle surfaces. Sample Emulsion No. 3 comprised 7 wt % with respect to the organic phase of the same particles. The emulsions were formed in reaction vessels under gentle stirring with an overhead stirrer at 400 rpm. After the emulsions were formed, 5 vol. % with respect to the organic phases of HYPERMER 2296 surfactant was added dropwise to each emulsion under gentle stirring. The emulsions were then transferred to Falcon tubes and the styrene and PEGDMA in the organic phase of each emulsion were permitted to polymerize in ovens at 70° C. for 24 hours, after which the samples were purified and dried according to the procedure described in Example 1, forming rigid polymer foams.

Figure 2:
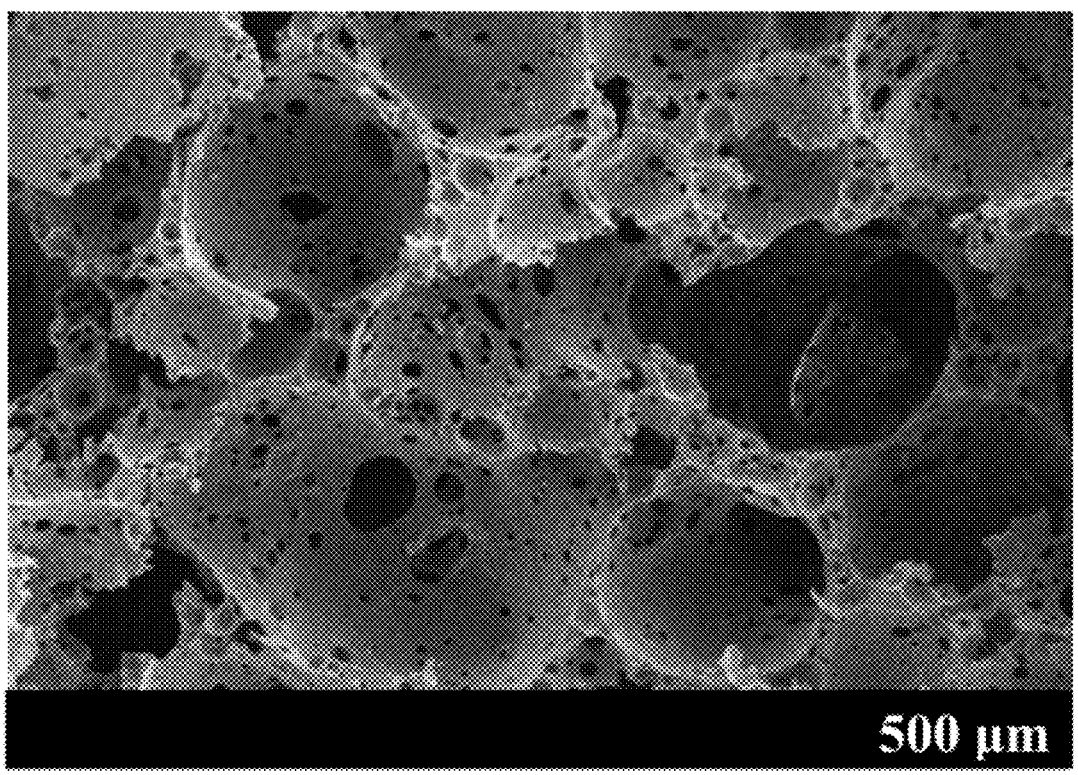
FIG. 2 is an SEM Image of the polymer foam prepared in Example 2 using Sample Emulsion No. 2.
Figure 3:
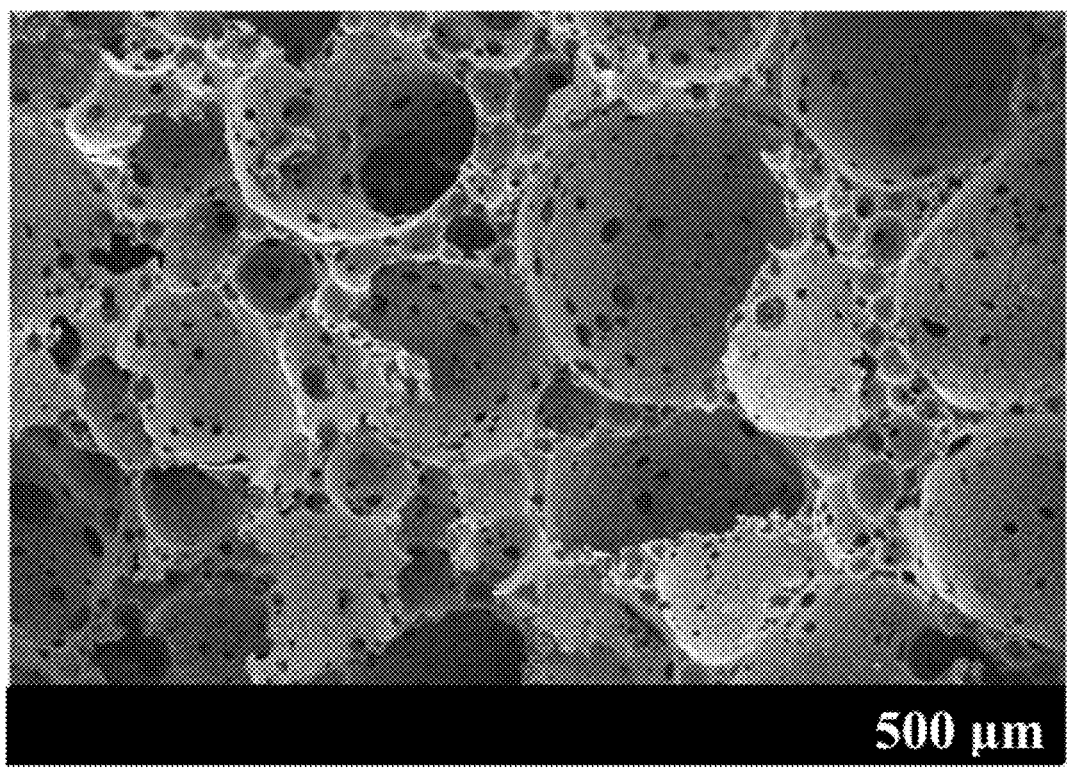
FIG. 3 is an SEM Image of the polymer foam prepared in Example 2 using Sample Emulsion No. 3.

The pore structures of the resulting polymer foams are shown in FIGS. 2 and 3. The foam formed with Sample Emulsion No. 2 had pores of 400-1500 μm in diameter, whereas the foam formed with Sample Emulsion No. 3 had pores of 150-1000 μm in diameter. The pore throats in both foams varied from 20-200 μm in diameter. The gas permeabilities of the foams were measured using the same gas pressure rise method as in Example 1, and were determined to be 1.6 D (Sample Emulsion No. 2) and 3.2 D (Sample Emulsion No. 3), respectively. The compressive strength measured using the same method as in Example 1, and for both foams was determined to be 2±0.5 MPa (approximately 300 psi).

Thus, Example 2 demonstrates that certain embodiments of the compositions and emulsions of the present invention may produce porous foams of higher permeability than those known previously in the art.

Gas Pressure Rise Method

The gas permeability of the foam samples formed in Examples 1 and 2 was measured using the following procedure. The foam sample was placed in a sealed sample cell to avoid any crossflow around the edges of the porous material, which was then evacuated using a vacuum pump to a pressure in the range of 10 Pa, which was maintained throughout the procedure. Once that pressure was achieved, a flow of nitrogen was applied to the upper side of the sample at a constant set pressure. The gas of known volume permeated through the sample and was collected on the low pressure side. The rate of pressure rise is used to determine the viscous permeability of the polymer foams.

At low flow rates, the gas flow through the foam is governed by Darcy's Law (Equation (1)):

$$k = \frac{u\mu L}{\Delta p} 0000000 \quad (1)$$

where k=permeability, u=superficial velocity of the gas, μ=fluid viscosity, L=sample length and p=pressure. To account for slip flow of the gas, the permeability coefficient K was found as a function of viscous and Knudsen contributions to the flow. The permeability coefficient can be calculated according to Equation (2):

$$K = \frac{Qp_0 L}{\Delta p A} = \frac{k}{\mu} p_m + \frac{4}{3} K_0 \sqrt{\frac{8RT}{\pi M}} \quad (2)$$

where K=permeability coefficient, Q=volumetric flow rate, $p_0$=pressure at which Q is measured, L=sample length, A=sample cross-sectional area, Δp=pressure difference across the sample, k=permeability, $p_m$=mean pressure, μ=gas viscosity, $K_0$=Knudsen permeability coefficient, R=gas constant, T=temperature and M=molar mass of gas. The technique works on the basis that the pressure drop Δp across the sample is effectively $p_1$ (the gas inlet pressure) and, therefore, the mean pressure is $p_m=p_1/2$.

If at the outlet the volumetric flow rate of gas is $Q_2$ at a pressure $p_2$ the relationship of Equation (3) applies:

$$Q_2 p_2 = V \frac{dp_2}{dt} \quad (3)$$

where $Q_2$=volumetric flow rate downstream (low pressure side), $p_2$=downstream pressure, V=volume and t=time. Substituting Equation (3) into Equation (2) gives the following relationship:

$$K = \frac{Q_2 p_2 L}{\Delta p A} = \frac{V\left(\frac{dp_2}{dt}\right)L}{p_1 A} = \frac{k}{\mu} p_m + \frac{4}{3} K_0 \sqrt{\frac{8RT}{\pi M}} \quad (4)$$

To determine the permeability k, the permeability coefficient K was calculated using Equation (4), where the parameter ($dp_2/dt$) was measured in the experiment and V=known volume and L and A are constant dimensions of the sample. A linear plot of K vs. $p_m$ has the gradient k/μ from which the permeability was derived.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method comprising:
providing a composition that comprises a plurality of inorganic particulates wherein the inorganic particulates have an average diameter from 20 nanometers to about 10 microns, an aqueous component, and an organic component comprising at least one polymerizable monomer and at least one surface active agent, wherein the monomer is present in an amount of about 20% to about 50% by volume of the organic component and the surface active agent is present in an amount of up to about 10% by volume of the organic component;
permitting the composition to form an emulsion that comprises an internal aqueous phase in an amount of at least about 50% by volume of the emulsion and a continuous organic phase;
introducing the composition into at least a portion of a subterranean formation; and
permitting the composition to form a porous and fluid-permeable polymer mass in at least a portion of the subterranean formation.

2. The method of claim 1 wherein the at least one polymerizable monomer comprises a crosslinker and another monomer.

3. The method of claim 1 wherein the plurality of inorganic particulates is present in an amount of 0.5% to about 40% by weight of the composition.

4. The method of claim 1 wherein the surface active agent is present in an amount of up to about 5% by volume of the organic component.

5. The method of claim 1 wherein the portion of the subterranean formation comprises at least one location selected from the group consisting of: an annular space between an outer surface of a fluid conduit and a wall of a well bore penetrating the portion of the subterranean formation; a space in a screen in a subterranean formation; one or more perforation tunnels in a subterranean formation; and any combination thereof.

6. The method of claim 1 comprising removing at least a portion of the surface active agent from the porous polymer mass.

7. The method of claim 1 wherein the gas permeability of the mass is at least about 500 millidarcies.

8. A method comprising:
providing an emulsion that comprises a plurality of inorganic particulates wherein the inorganic particulates have an average diameter from 20 nanometers to about 10 microns, an internal aqueous phase in an amount of at least about 50% by volume of the emulsion, and a continuous organic phase comprising at least one polymerizable monomer and at least one surface active agent, wherein the monomer is present in an amount of about 20% to about 50% by volume of the organic phase and the surface active agent is present in an amount of up to about 10% by volume of the organic phase;
introducing the emulsion into at least a portion of a subterranean formation; and
permitting the emulsion to form a porous and fluid-permeable polymer mass in at least a portion of the subterranean formation.

9. The method of claim 8 wherein the at least one polymerizable monomer comprises a crosslinker and another monomer.

10. The method of claim 8 wherein the internal aqueous phase is present in an amount of at least about 70% by volume of the emulsion.

11. The method of claim 8 wherein the plurality of inorganic particulates is present in an amount of 0.5% to about 40% by weight of the emulsion.

12. The method of claim 8 wherein the portion of the subterranean formation comprises at least one location selected from the group consisting of: an annular space between an outer surface of a fluid conduit and a wall of a well bore penetrating the portion of the subterranean formation; a space in a screen in a subterranean formation; one or more perforation tunnels in a subterranean formation; and any combination thereof.

13. The method of claim 8 wherein:
the portion of the subterranean formation comprises at least a portion of a well bore penetrating a subterranean formation adjacent to an unconsolidated portion of the subterranean formation; and
the porous and fluid-permeable polymer mass is formed between the unconsolidated portion of the subterranean formation and the well bore.

14. The method of claim 8 comprising removing at least a portion of the surface active agent from the porous polymer mass.

15. The method of claim 8 wherein the gas permeability of the mass is at least about 500 millidarcies.

16. A method comprising:
providing an emulsion that comprises a plurality of inorganic particulates wherein the inorganic particulates have an average diameter from 20 nanometers to about 10 microns, an internal aqueous phase in an amount of at least about 50% by volume of the emulsion, and a continuous organic phase comprising at least one polymerizable monomer and at least one surface active agent, wherein the monomer is present in an amount of about 20% to about 50% by volume of the organic phase and the surface active agent is present in an amount of up to 10% by volume of the organic phase;
introducing the emulsion into at least a portion of a subterranean formation; and
permitting the emulsion to form a porous and fluid-permeable polymer mass in at least a portion of the subterranean formation.

17. The method of claim 16 wherein the at least one polymerizable monomer comprises a crosslinker and another monomer.

18. The method of claim 16 comprising removing at least a portion of the surface active agent from the porous polymer mass.

19. The method of claim 16 wherein the gas permeability of the mass is at least about 500 millidarcies.

20. The method of claim 16 wherein the mass comprises a plurality of pore throats connecting a plurality of pore spaces therein, the pore throats having an average diameter of at least about 1 μm.

* * * * *